US010582300B2

(12) United States Patent
Bjork et al.

(10) Patent No.: US 10,582,300 B2
(45) Date of Patent: Mar. 3, 2020

(54) TEMPERATURE MONITORING FOR LOUDSPEAKERS

(71) Applicant: Cirrus Logic International Semiconductor Ltd., Edinburgh (GB)

(72) Inventors: Ylva Ellen Maria Bjork, Solna (SE); Erik Vilhelm Lindahl, Stockholm (SE); Jason William Lawrence, Austin, TX (US); Christopher Ekbom, Bromma (SE)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/006,139

(22) Filed: Jun. 12, 2018

(65) Prior Publication Data

US 2018/0367897 A1  Dec. 20, 2018

Related U.S. Application Data

(60) Provisional application No. 62/520,097, filed on Jun. 15, 2017.

(30) Foreign Application Priority Data

Jul. 26, 2017 (GB) .................................. 1712022.1

(51) Int. Cl.
*H04R 3/00* (2006.01)
*G01K 7/16* (2006.01)
*H04R 29/00* (2006.01)

(52) U.S. Cl.
CPC ............... *H04R 3/007* (2013.01); *G01K 7/16* (2013.01); *H04R 29/001* (2013.01); *G01K 2217/00* (2013.01); *H04R 29/003* (2013.01)

(58) Field of Classification Search
CPC ........ G01K 7/16; G01K 2217/00; H03G 5/16; H04R 3/00; H04R 3/007; H04R 29/00; H04R 29/001; H04R 29/003; H04R 3/12
(Continued)

(56) References Cited

U.S. PATENT DOCUMENTS

| 4,887,298 A | * | 12/1989 | Haigler | ................. | H03G 3/301 |
| | | | | | 381/55 |
| 9,942,676 B1 | * | 4/2018 | Jensen | ................. | H04R 29/001 |

(Continued)

FOREIGN PATENT DOCUMENTS

| EP | 3026931 A1 | 6/2016 |
| GB | 2526881 A | 12/2015 |
| GB | 2542643 A | 3/2017 |

OTHER PUBLICATIONS

Combined Search and Examination Report, UKIPO, Application No. GB1712022.1, dated Jan. 19, 2018.
(Continued)

*Primary Examiner* — Gerald Gauthier
(74) *Attorney, Agent, or Firm* — Jackson Walker L.L.P.

(57) ABSTRACT

Methods and Apparatus for estimating a temperature of an electromechanical transducer. The method comprising receiving an audio signal (901); providing an output signal to the electromechanical transducer, based on the audio signal (902); and determining whether a first magnitude of the audio signal in a first frequency band is above a magnitude threshold (903). In response to the first magnitude being above or equal to the magnitude threshold, calculating a first impedance of the electromechanical transducer based on measurements of a first voltage and a first current of the electromechanical transducer within the first frequency band (905), and estimating the temperature of the electromechanical transducer based on the first impedance (907). In response to the first magnitude being below the magnitude threshold, inserting a pilot tone into the audio signal (909), wherein the pilot tone is at a pilot tone frequency, calculating a second impedance of the electromechanical transducer based on measurements of a second voltage and a second current of the electromechanical trans-
(Continued)

ducer at the pilot tone frequency (911), and estimating the temperature of the electromechanical transducer based on the second impedance (913).

21 Claims, 9 Drawing Sheets

(58) Field of Classification Search
USPC .............. 381/55, 58, 59, 120, 117; 330/284
See application file for complete search history.

(56) References Cited

U.S. PATENT DOCUMENTS

| | | | | |
|---|---|---|---|---|
| 2004/0178852 A1* | 9/2004 | Neunaber | ................. | H03F 1/52 |
| | | | | 330/284 |
| 2004/0184623 A1* | 9/2004 | Johannsen | ............. | H04R 3/002 |
| | | | | 381/117 |
| 2011/0194705 A1* | 8/2011 | Gautama | ................... | H03F 1/30 |
| | | | | 381/59 |
| 2012/0300949 A1* | 11/2012 | Rauhala | ............... | H04R 29/001 |
| | | | | 381/55 |
| 2013/0022207 A1* | 1/2013 | Luo | ........................ | H03G 9/005 |
| | | | | 381/55 |
| 2013/0077795 A1* | 3/2013 | Risbo | .................. | H04R 29/003 |
| | | | | 381/55 |
| 2013/0083928 A1* | 4/2013 | Williams | ............... | H03G 7/002 |
| | | | | 381/55 |
| 2014/0086418 A1* | 3/2014 | Lubberhuizen | ........ | H04R 9/022 |
| | | | | 381/55 |
| 2014/0126730 A1* | 5/2014 | Crawley | ............. | H04R 29/001 |
| | | | | 381/59 |
| 2014/0146971 A1* | 5/2014 | Marguery | ............. | H04R 3/007 |
| | | | | 381/55 |
| 2014/0169571 A1* | 6/2014 | Polleros | ................. | H04R 3/007 |
| | | | | 381/55 |
| 2014/0177850 A1* | 6/2014 | Quan | ................... | H04R 29/001 |
| | | | | 381/55 |
| 2014/0241536 A1* | 8/2014 | Adams | ................. | H04R 29/003 |
| | | | | 381/59 |
| 2014/0254804 A1* | 9/2014 | Su | .......................... | H04R 3/007 |
| | | | | 381/55 |
| 2015/0086025 A1* | 3/2015 | Oyetunji | ................ | H04R 3/007 |
| | | | | 381/55 |
| 2015/0146875 A1* | 5/2015 | Gautama | .............. | H04R 29/003 |
| | | | | 381/58 |
| 2015/0181318 A1* | 6/2015 | Gautama | .................. | H04R 1/00 |
| | | | | 381/59 |
| 2015/0215704 A1* | 7/2015 | Magrath | ................ | H04R 9/022 |
| | | | | 381/55 |
| 2015/0237443 A1* | 8/2015 | Ronig | .................... | H04R 3/007 |
| | | | | 381/55 |
| 2015/0256931 A1* | 9/2015 | Ishii | ....................... | H04R 3/007 |
| | | | | 381/55 |
| 2015/0296293 A1 | 10/2015 | Hogan et al. | | |
| 2015/0304772 A1* | 10/2015 | Risberg | ................. | H04R 3/007 |
| | | | | 381/55 |
| 2016/0050497 A1* | 2/2016 | Daubigny | ................ | H04R 9/06 |
| | | | | 381/120 |
| 2016/0105746 A1* | 4/2016 | Berthelsen | ............. | H04R 3/007 |
| | | | | 381/55 |
| 2016/0182998 A1* | 6/2016 | Galal | ...................... | H03F 1/523 |
| | | | | 381/55 |
| 2016/0322949 A1* | 11/2016 | Gautama | ................ | H03G 9/005 |
| 2016/0373871 A1* | 12/2016 | Ronig | .................. | H04R 29/003 |
| 2017/0105068 A1* | 4/2017 | Lesso | ..................... | H04R 3/007 |
| 2017/0180859 A1* | 6/2017 | Lesso | ........................ | H04R 3/12 |
| 2017/0347189 A1* | 11/2017 | Thyssen | ................ | H04R 3/007 |
| 2018/0279044 A1* | 9/2018 | Thormundsson | ...... | H04R 3/007 |
| 2018/0367897 A1* | 12/2018 | Bjork | ...................... | G01K 7/16 |

OTHER PUBLICATIONS

International Search Report and Written Opinion of the International Searching Authority, International Application No. PCT/GB2018/051576, dated Jul. 24, 2018.

\* cited by examiner

TEMPERATURE MONITORING FOR LOUDSPEAKERS

Methods and apparatus are disclosed for monitoring and/or determining the temperature of a voice coil of a loudspeaker, and in particular to methods and apparatus for protecting a speaker from overheating by estimating the temperature of the voice coil of the speaker.

A number of different products include audio circuitry, such as an audio amplifier, together with one or more speakers and/or connections for driving one or more speakers of a peripheral apparatus, such as a headset. In other examples, an audio amplifier may provide ultrasonic signals for use in driving a haptic device. In some instances, the speaker(s) chosen will be robust enough and large enough to handle the maximum power level at which the amplifier could drive signals continuously into it, even under the worst case environmental conditions, for instance maximum supply voltage, maximum ambient temperature etc. However, having robust enough speakers is not always economical, and, for portable devices in particular, the desire is typically to make the speaker as small and light as possible. This desire can potentially lead to the audio drive circuitry overloading the speaker. One particular problem is thermal overload of the speaker.

Figure 1:
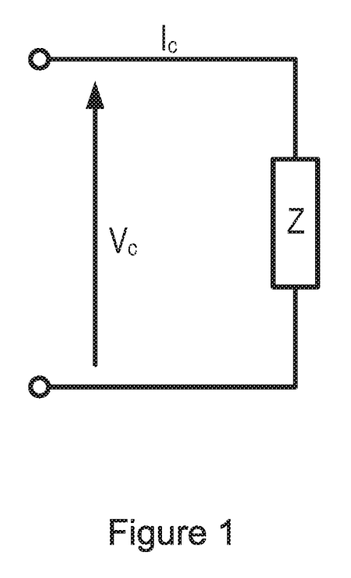
FIG. 1 illustrates an electrical model of a speaker voice coil.

A typical speaker comprises a diaphragm which is driven by a voice coil supported relative to a magnet. In typical use, an analogue audio drive signal is applied to the voice coil to drive the speaker. FIG. 1 illustrates an electrical model of a speaker voice coil. When a voltage $V_C$ is applied to the voice coil, a current $I_C$ flows. The voice coil impedance observed as defined by $V_C/I_C$ comprises some inductance, capacitance and resistance. However, at low audio frequencies the ohmic resistance $R_E$ of the coil winding dominates. It will be understood that power PD is dissipated in the speaker ($P_D = I_C^2 \times R_E = V_C^2/R_E$) primarily as ohmic losses in the voice coil which can cause heating of the voice coil. One particular problem to be avoided is overheating of the voice coil which could result in degradation in performance and/or damage to the speaker. In some particular applications therefore, there may be speaker protection circuitry for controlling the speaker operation to avoid the voice coil temperature exceeding a specified limit.

In some applications, the temperature is modelled by a predetermined plant model, based on calculated power dissipation and pre-characterised thermal impedances.

However, to avoid inaccuracies or guard-banding to accommodate sample-to sample thermal impedance variations, the temperature of the coil is measured more directly.

In some applications, the temperature of the voice coil is measured by a sensor, for example, a thermistor or a diode attached to the speaker. However, this sensor adds expense, and it may not be practical to attach the sensor close enough to exactly track the temperature of the voice coil. One known alternative is to use the temperature coefficient of the metal conductor material used for the coil windings. In other words, to measure the equivalent coil impedance Z and deduce its temperature from the variation of the impedance Z over time using a known or calibrated value of the impedance Z at a reference temperature and a known value of the variation of its metal impedance with temperature, thus monitoring the temperature of the actual coil winding without an extra sensor component.

Embodiments of the present disclosure relate to estimating the temperature of a voice coil of a speaker by taking a measurement of the impedance of the voice coil or some function thereof and comparing this measurement to a calibration value or relationship.

SUMMARY

According to some embodiments there is provided a method for estimating a temperature of an electromechanical transducer, comprising receiving an audio signal; providing an output signal to the electromechanical transducer, based on the audio signal; determining whether a first magnitude of the audio signal in a first frequency band is above a magnitude threshold; in response to the first magnitude being above or equal to the magnitude threshold, calculating a first impedance of the electromechanical transducer based on measurements of a first voltage and a first current of the electromechanical transducer within the first frequency band, and estimating the temperature of the electromechanical transducer based on the first impedance; and in response to the first magnitude being below the magnitude threshold, inserting a pilot tone into the audio signal, wherein the pilot tone is at a pilot tone frequency, calculating a second impedance of the electromechanical transducer based on measurements of a second voltage and a second current of the electromechanical transducer at the pilot tone frequency, and estimating the temperature of the electromechanical transducer based on the second impedance.

The pilot tone frequency may be outside of an audible frequency band.

The method may further comprise selecting the first frequency band such that an impedance of the electromechanical transducer and a temperature of the electromechanical transducer have a known relationship within the first frequency band. The first frequency band may be between 4 kHz and 6 kHz.

A pilot tone magnitude of the pilot tone may be adjustable. The method may further comprise setting the pilot tone magnitude based on the first magnitude. The method may further comprise setting the pilot tone magnitude such that the first magnitude and the pilot tone magnitude have an inverse relationship.

The method may further comprise calculating the second impedance based on measurements of the second voltage and the second current of the electromechanical transducer at the pilot tone frequency, FPT and further based on measurements of the first voltage and the first current of the electromechanical transducer within the first frequency band.

The method may further comprising limiting the audio signal based on a pilot tone magnitude of the pilot tone such that the audio signal does not exceed an excursion limit of the electromechanical transducer. The excursion limit of the excursion protection model may be set based on the pilot tone magnitude before the corresponding pilot tone is inserted into the audio signal.

The method may further comprise limiting the magnitude of the audio signal and the magnitude of the pilot tone signal based on the excursion limit.

The method may further comprise, if the estimated temperature, TEST is above a first temperature threshold, attenuating the audio signal to provide the output signal.

The method may further comprise setting a magnitude of the pilot tone based on the estimated temperature.

The method may further comprise: calculating a model temperature of the electromechanical transducer based on the estimated temperature and based on a temperature model of the electromechanical transducer; and, if the model temperature of the electromechanical transducer is above a first temperature threshold, attenuating the audio signal to provide the output signal. The step of inserting the pilot tone into the audio signal may be performed in response to the first magnitude being below the magnitude threshold, and in response to determining that the model temperature is above a second temperature threshold wherein the second model temperature is below the first temperature threshold.

The method may further comprise setting a magnitude of the pilot tone based on the model temperature.

The method may further comprise calculating the model temperature of the electromechanical transducer based on the audio signal.

The method may further comprise: calculating an estimated dissipated power across the electromechanical transducer; and calculating the model temperature of the electromechanical transducer based on the estimated dissipated power.

According to another aspect, there is provided a method of providing excursion protection for an electromechanical transducer, comprising: receiving a pilot tone signal and an audio signal; outputting an output signal based on the audio signal; and limiting a magnitude of the output signal based on an excursion limit of the electromechanical transducer, a magnitude of the pilot tone signal and a magnitude of the audio signal.

According to another aspect there is provided software code stored on a non-transitory storage medium which, when run on a suitable processor, performs the method as described above.

According to another aspect there is provided a system for estimating a temperature of an electromechanical transducer, comprising: an input for receiving an audio signal, an output for providing an output signal based on the audio signal to the electromechanical transducer; a band detection module configured to determine whether a first magnitude of the audio signal in a first frequency band is above a magnitude threshold; an insertion module configured to insert a pilot tone into the audio signal in response to the first magnitude being below the magnitude threshold, wherein the pilot tone is at a pilot tone frequency, an impedance calculation module configured to, in response to the first magnitude being above or equal to the magnitude threshold, calculate a first impedance of the electromechanical transducer based on measurements of a first voltage and a first current of the electromechanical transducer within the first frequency band, and in response to the first magnitude being below the magnitude threshold, calculate a second impedance of the electromechanical transducer based on measurements of a second voltage and a second current of the electromechanical transducer at the pilot tone frequency; and a temperature estimation module configured to estimate the temperature of the electromechanical transducer based on the first impedance or the second impedance.

According to another aspect there is provided a system for providing excursion protection for an electromechanical transducer, comprising: an input configured to receive a pilot tone signal and an audio signal; and an excursion limitation module configured to limit the magnitude of the audio signal based on an excursion limit of the electromechanical transducer, a magnitude of the pilot tone signal and a magnitude of the audio signal.

According to another aspect there is provided an electronic apparatus comprising a system as described above.

BRIEF DESCRIPTION OF THE FIGURES

For a better understanding of the present disclosure, and to show how it may be put into effect, reference will now be made, by way of example only, to the accompanying drawings, in which.

DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the present disclosure relate to methods and apparatus for estimating a temperature of an electromechanical transducer. In particular, embodiments disclosed herein relate to the use of a pilot tone for determining the temperature of an electromechanical transducer, for example the voice coil of a speaker.

Figure 2:
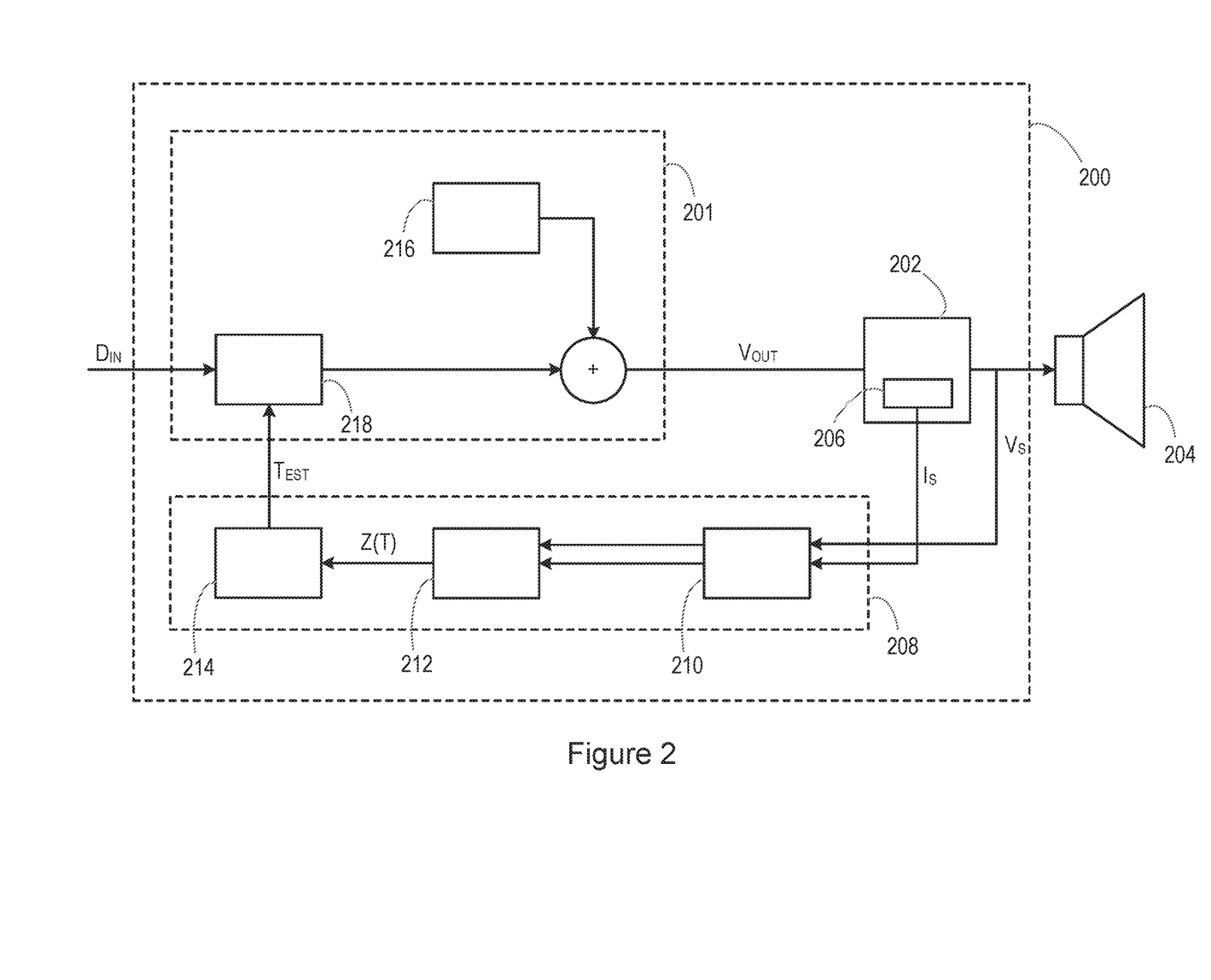
FIG. 2 illustrates speaker protection circuitry according to some embodiments.

FIG. 2 illustrates speaker protection circuitry 200 according to some embodiments. The speaker protection circuitry may comprise a signal processing module 201 which is configured to receive an input signal $D_{IN}$ at an input terminal and process the input signal $D_{IN}$, providing an output signal $V_{OUT}$ to an output driver amplifier 202. The output driver amplifier 202 may be configured to drive a speaker 204. In this example, the input signal $D_{IN}$ is a digital signal, but in other embodiments, it may be an analogue signal. The output driver amplifier 202 may comprise any type of amplifier stage such as a Class D, Class AB, Class G or Class H power amplifier stage and associated modulation circuitry.

The input terminal may be a circuit contact such as a bond pad or the like for connecting to another circuit, or could simply be a node of a signal path which represents the input to the signal processing module 201. For the avoidance of doubt, the phrase "input terminal" as used herein includes an input node and no particular physical characteristics are implied by the word "terminal".

The signal processing module 201 may comprise a multiplier or digital gain stage, digital filtering or other digital processing and a digital-analogue convertor. In converting from a digital signal to an analogue signal, the signal processing module 201 may impart an overall gain from the input signal $D_{IN}$ to the drive signal VIN input into the output driver amplifier 202.

The output driver amplifier 202 comprises current sensing circuitry 206 for sensing the current $I_S$ flowing through the voice coil of the speaker. This current $I_S$ may, for example, be sensed in a power supply or ground return lead, monitored in series with the load, or monitored by sensing the current through, or the voltage across, the amplifier output elements.

A temperature determination module 208 may therefore receive an indication of the sensed voice coil current $I_S$ and the voice coil voltage $V_S$ and, from these current and voltage signals, it may determine an estimated temperature of the voice coil of the speaker 204. The temperature determination module 208 may comprise a bandpass filter 210 to determine the voice coil current $I_S$ and the voice coil voltage $V_S$ at a particular frequency or frequency band, such that an impedance calculation module 212 may determine the impedance of the speaker at the filtered frequency or frequency band. In particular, the particular frequency or frequency band may be chosen to include a pilot tone frequency, as will be described below.

A temperature estimation module 214 may then determine an estimated temperature $T_{EST}$ of the voice coil from the impedance of the speaker at the filtered frequency or frequency band, an impedance at a known temperature, and a known temperature coefficient. In some embodiments, in order to ensure that a signal is present in the filtered frequency or frequency band, a pilot tone may be generated by a pilot tone generator 216 and may be added to the output signal within the signal processing module 201 during certain time periods.

In particular, the pilot tone may be a low frequency pilot tone which is inaudible, i.e. below 20 Hz, so as to not perceptually change the audio signal being driven through the speaker 204. In some examples, the pilot tone frequency may be considered to be inaudible if it is a frequency which cannot be reproduced by the speaker through which it is being driven. For example, in some embodiments, a frequency of 48 Hz is used for a particular type of microspeaker. In examples where a pilot tone is used, the bandpass filter 210 may be configured to filter at the frequency of the pilot tone, at least during the time periods in which the pilot tone is being generated.

The temperature estimation module 214 may output a control signal to a power limitation module 218 within the signal processing module 201. The control signal may indicate to the power limitation module 218 the estimated temperature $T_{EST}$ of the voice coil. The power limitation module 218 may then adjust a gain applied to the input signal $D_{IN}$ based on the received estimated temperature $T_{EST}$ of the voice coil. For example, if the estimated temperature $T_{EST}$ of the voice coil is found to be above a certain first threshold temperature $T_1$, the power limitation module 218 may decrease the gain applied to the input signal $D_{IN}$.

Figure 3A:
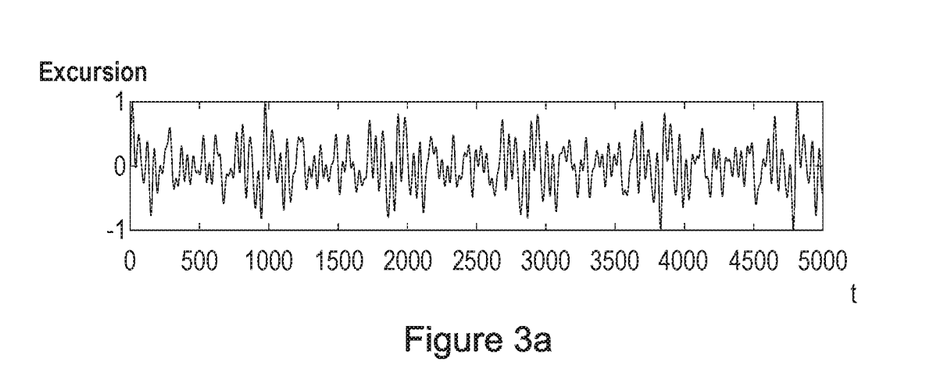
FIG. 3a illustrates an example of the excursion of an input signal.
Figure 3B:
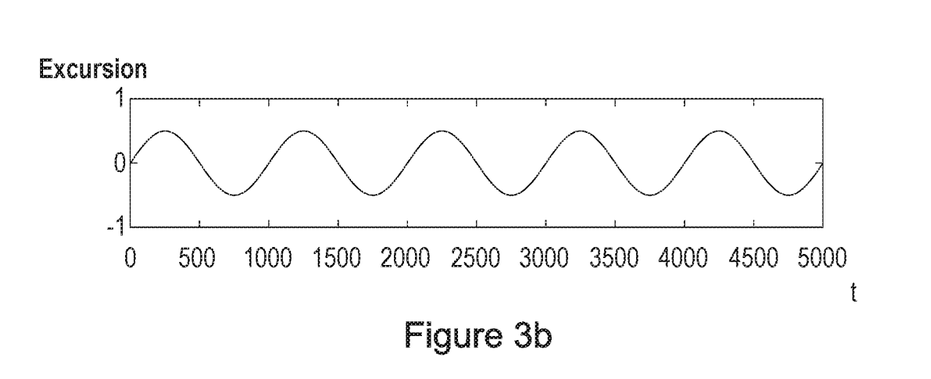
FIG. 3b illustrates an example of the excursion caused by a pilot tone.
Figure 3C:
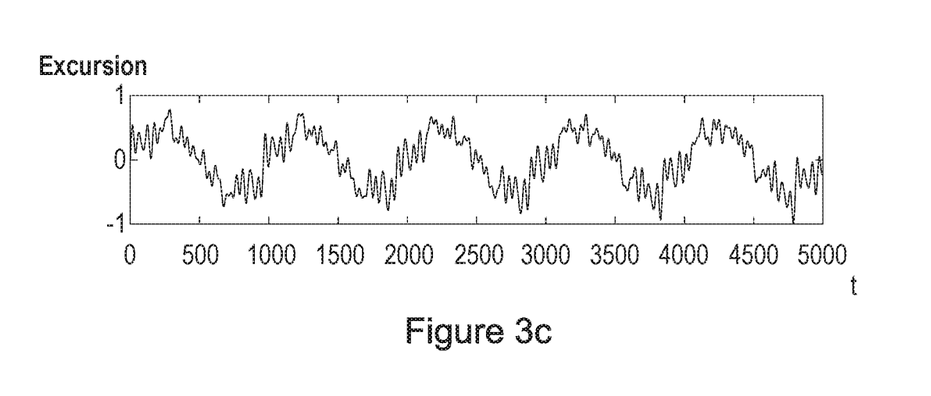
FIG. 3c illustrates the excursion of an example signal when the example pilot tone is inserted into the audio signal.

However, the use of a pilot tone may cause undesirable intermodulation of the audio signal. FIG. 3a illustrates an example of the excursion of an example audio input signal as a function of time, FIG. 3b illustrates an example of the excursion caused by a pilot tone as a function of time, and FIG. 3c illustrates the excursion of the audio signal when the pilot tone is inserted into the audio signal as a function of time. It can be seen from this figure that the pilot tone causes a large proportion of the excursion in the excursion range.

Figure 4:
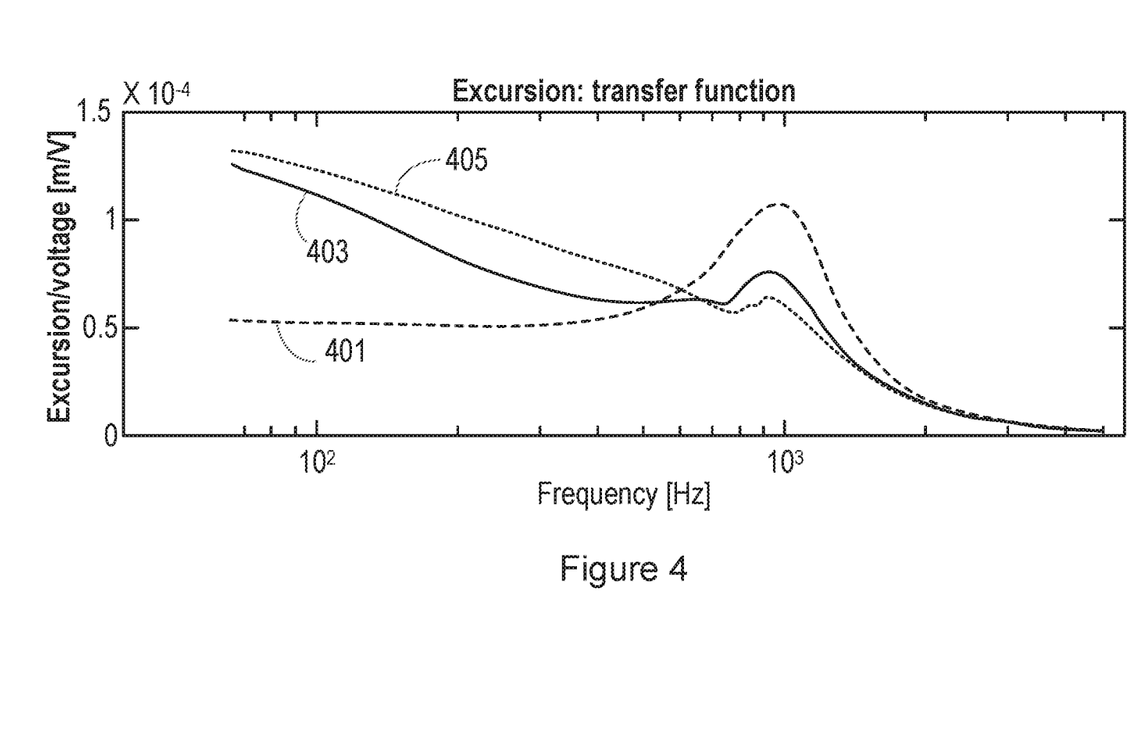
FIG. 4 illustrates the excursion transfer function for different transducers as a function of frequency.

The pilot tone may also take up excursion headroom of the electromechanical transducer. This headroom demand may be a particular issue for earpiece speakers as there may be no enclosure, and therefore a large excursion may occur at low frequencies, for example a low, inaudible, pilot tone frequency. FIG. 4 illustrates the excursion transfer function, i.e. the amount of excursion for a given voltage, for different transducers as a function of frequency. It can be seen from this figure how a low frequency pilot tone may cause a large increase in excursion for some types of transducer. In particular, some transducers exhibit relatively large excursions for relatively small signals at infrasound frequencies. In this example, the line 401 depicts the excursion transfer function of a transducer having a sealed enclosure. The excursion at low frequencies for this type of transducer is relatively low. The line 403 depicts the excursion transfer function for a transducer which is more leaky than the sealed transducer. The excursions at low frequencies for this type of transducer are much larger. The line 405 depicts the excursion transfer function for a transducer which is highly leaky. The excursions at low frequencies are again very large for this type of transducer. The low frequency pilot tone may therefore cause large excursions in some types of transducer.

The presence of the pilot tone in the input signal may therefore be undesirable, even though the pilot tone itself may be inaudible.

Figure 5:
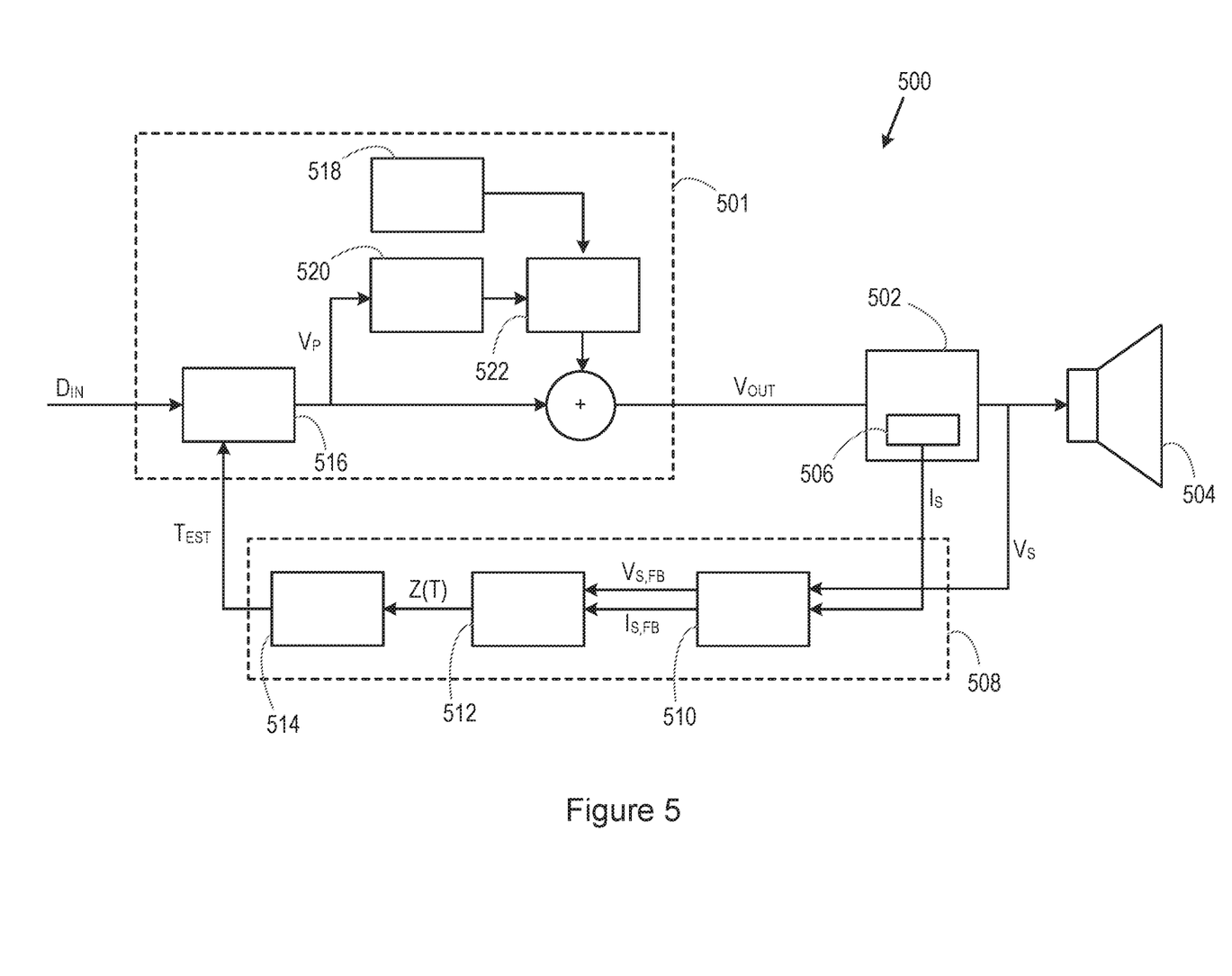
FIG. 5 illustrates speaker protection circuitry according to some embodiments.

FIG. 5 illustrates speaker protection circuitry 500 according to some embodiments. The speaker protection circuitry 500 may comprise a signal processing module 501 which receives an input signal $D_{IN}$ at an input terminal and processes it, providing an output signal $V_{OUT}$ to an output driver amplifier 502. The output driver amplifier 502 may be configured for driving a speaker 504. It will be appreciated that the output driver amplifier 502 may be configured to drive any form of electromechanical transducer.

In this example, the input signal $D_{IN}$ is a digital signal, but in other embodiments, it may be an analogue signal. The output driver amplifier 502 may comprise any type of amplifier stage such as a Class D, Class AB, Class G or Class H power amplifier stage and associated modulation circuitry.

The input terminal may be a circuit contact such as a bond pad or the like for connecting to another circuit, or could simply be a node of a signal path which represents the input to the signal processing module 501. For the avoidance of doubt, the phrase "input terminal" as used herein includes an input node and no particular physical characteristics are implied by the word "terminal".

The signal processing module 501 may comprise a multiplier or digital gain stage, digital filtering or other digital processing and a digital-analogue convertor. In converting from a digital signal to an analogue signal, the signal processing module 501 may impart an overall gain from the input signal $D_{IN}$ to the drive signal $V_{IN}$ input into the output driver amplifier 502.

The output driver amplifier 502 comprises current sensing circuitry 506 for sensing the current $I_S$ flowing through the voice coil of the speaker. This current $I_S$ may, for example, be sensed in a power supply or ground return lead, monitored in series with the load, or monitored by sensing current through or voltage across the amplifier output elements.

In this example, in order to limit the use of a pilot tone and hence limit the associated intermodulation and extra excursion of the speaker, the system is configured to, in some circumstances, use the actual audio signal within a first frequency band in order to determine the voltage and current of the voice coil, and hence estimate the temperature of the voice coil.

Figure 6:
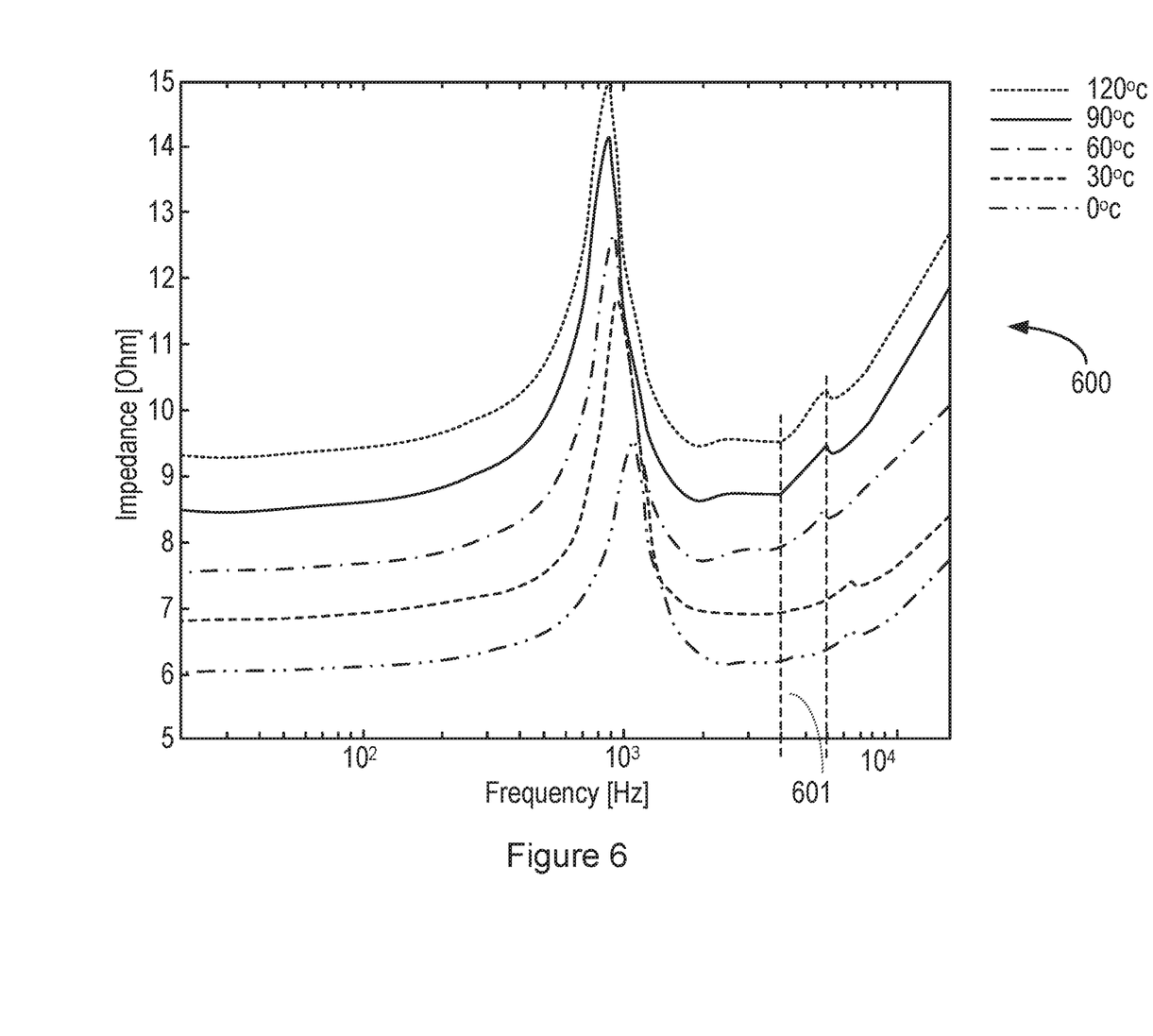
FIG. 6 illustrates a graph of the impedance of a loudspeaker voice coil, plotted against the frequency of an audio signal being passed through it.

FIG. 6 illustrates a graph 600 of the impedance of a loudspeaker voice coil, plotted against the frequency of an audio signal being passed through it. The impedance-frequency characteristics at the temperatures 0° C., 30° C., 60° C., 90° C. and 120° C. are shown separately. In particular, FIG. 6 illustrates an example of a first frequency band 601 in an audio signal. In particular, the first frequency band 601 of the audio signal which may be useful for estimating the impedance of the voice coil, and therefore the temperature, may be a frequency band in which the impedance is essentially independent of the frequency. Alternatively, the relationship between the impedance and the frequency in the first frequency band for example, the frequency band 601 in FIG. 6 which, in this example, extends between 4 kHz to 6 kHz, may be a known relationship. This relationship may be compensated for using adaptive filters before determining the temperature from the varying impedance within the first frequency band. Alternatively, the first frequency band may be chosen such that the impedance and frequency relationship only varies slightly. In this example, the change in impedance within the chosen frequency band may fall within an acceptable error.

Returning to FIG. 5, a temperature determination module 508 may therefore receive an indication of the sensed voice coil current $I_S$ and the voice coil voltage $V_S$, and may determine from these sensed values an estimated temperature $T_{EST}$ of the voice coil of the speaker. In this example, the temperature determination module 508 may comprise a bandpass filter 510 which is configured to determine the voice coil current $I_{S,FB}$ and the voice coil voltage $V_{S,FB}$ within a first frequency band of the audio signal, for example a frequency band 601 as shown in FIG. 6. An impedance calculation module 512 may calculate a first impedance, $Z_1$ of the voice coil from the voice coil current $I_{S,FB}$ and voice coil voltage $V_{S,FB}$.

Therefore, in some examples, selecting a first frequency band in which the impedance is independent of the frequency of the audio signal, the impedance calculation module may determine the first impedance of the voice coil regardless of the different frequencies of the signals in the first frequency band.

In some example embodiments, the first frequency band may comprise a plurality of separate frequency bands. In particular, the plurality of frequency bands may be selected such that they are all frequency bands in which the relationship between the impedance of the speaker and the frequency of the audio signal is known.

A temperature estimation module 514 may then determine an estimated temperature $T_{EST}$ of the voice coil from the first impedance, an impedance of the voice coil at a known temperature, and a known temperature coefficient for the relationship between the impedance and the temperature of the voice coil.

The estimated temperature $T_{EST}$ may be indicated to a power limitation module 516 which can adjust the gain applied to the input signal $D_{IN}$ in order to avoid the temperature of the voice coil increasing further and causing any damage to the voice coil.

In some examples, the power limitation module 516 may decrease the gain applied to the input signal $D_{IN}$ if the estimated temperature $T_{EST}$ is above a threshold temperature $T_1$. The amount of reduction of the gain may be related to how much greater the estimated temperature, $T_{EST}$, is than the threshold temperature, $T_1$.

However, in some scenarios there may be no signal, or not enough signal, present in the first frequency band, for example the frequency band 601, to provide an estimate of the impedance of the voice coil of the speaker. In these cases, there will not be enough signal within the first frequency band for the impedance calculation module to calculate a first impedance. Therefore, in order to ensure that there is available signal for the impedance calculation module, a pilot tone may be generated by a pilot tone generator 518 and may be added to the output signal within the signal processing module 501. Therefore, in scenarios where the pilot tone is present, the impedance calculation module may utilise the pilot tone frequencies to calculate a second impedance. It will be appreciated that the pilot tone frequency signals may be utilised at the same time as the signals available in the filtered first frequency band to calculate the second impedance. In some embodiments, the magnitude of the pilot tone signal is selected based on the magnitude of the audio signal in the first frequency band. In other words, in some embodiments, the smaller the magnitude of the audio signal in the first frequency band, the larger the selected magnitude of the pilot tone signal.

In particular, the pilot tone may be a low frequency pilot tone which is inaudible, e.g. below 20 Hz or below some frequency that the speaker cannot reproduce, so as not to affect the audio signal being driven through the speaker 504. In other words, the pilot tone frequency is chosen so that a listener would not be able to hear it when it is output through the speaker with the output signal. In this case, when the pilot tone is inserted into the audio signal, the bandpass filter may be configured to filter at the frequency of the pilot tone. In some cases, the bandpass filter may be configured to switch between a first mode in which it filters signals in the first frequency band, and a second mode in which the bandpass filter filters at the pilot tone frequency. The band pass filter may then switch modes depending on whether the pilot tone is inserted into the audio signal. In other embodiments, the bandpass filter continually filters signals at frequencies both within the first frequency band and at the pilot tone frequency.

In order to determine whether or not a pilot tone may be required, the speaker protection circuitry 500 comprises a band detection module 520. In this example embodiment, the audio signal $V_P$, which may in some embodiments be limited by the power limitation module 516, may be passed through the band detection module 520. The band detection module 520 determines whether a first magnitude of the signal $V_p$ is above a magnitude threshold M in a first frequency band. The first frequency band is the frequency band that the system is intending to use for determining the impedance of the voice coil, and hence determining the temperature. However, in some scenarios, the input audio signal $V_P$ may not contain any signal in said first frequency band, or may only contain a small level of signal.

If therefore, at any given moment in time, there is no signal or only a small signal in the first frequency band, there will be no signal, or not enough signal, for the impedance calculation module 512 to use to calculate an estimated impedance of the voice coil. In order to avoid this problem, therefore, a pilot tone is added to the signal if the band detection module 520 detects that there is no signal in the first frequency band, or if there is not enough signal in the first frequency band to calculate an estimated temperature. The band detection module 520 may therefore send a control signal to an insertion module 522 to control whether or not the pilot tone is inserted into the audio signal.

For example, it may be a requirement that the level of signal in the first frequency band is above a magnitude threshold, M, therefore any signals below this threshold would be considered to be small signals, or signals which are too small to be able to determine an accurate estimate of the temperature of the voice coil.

Figure 7:
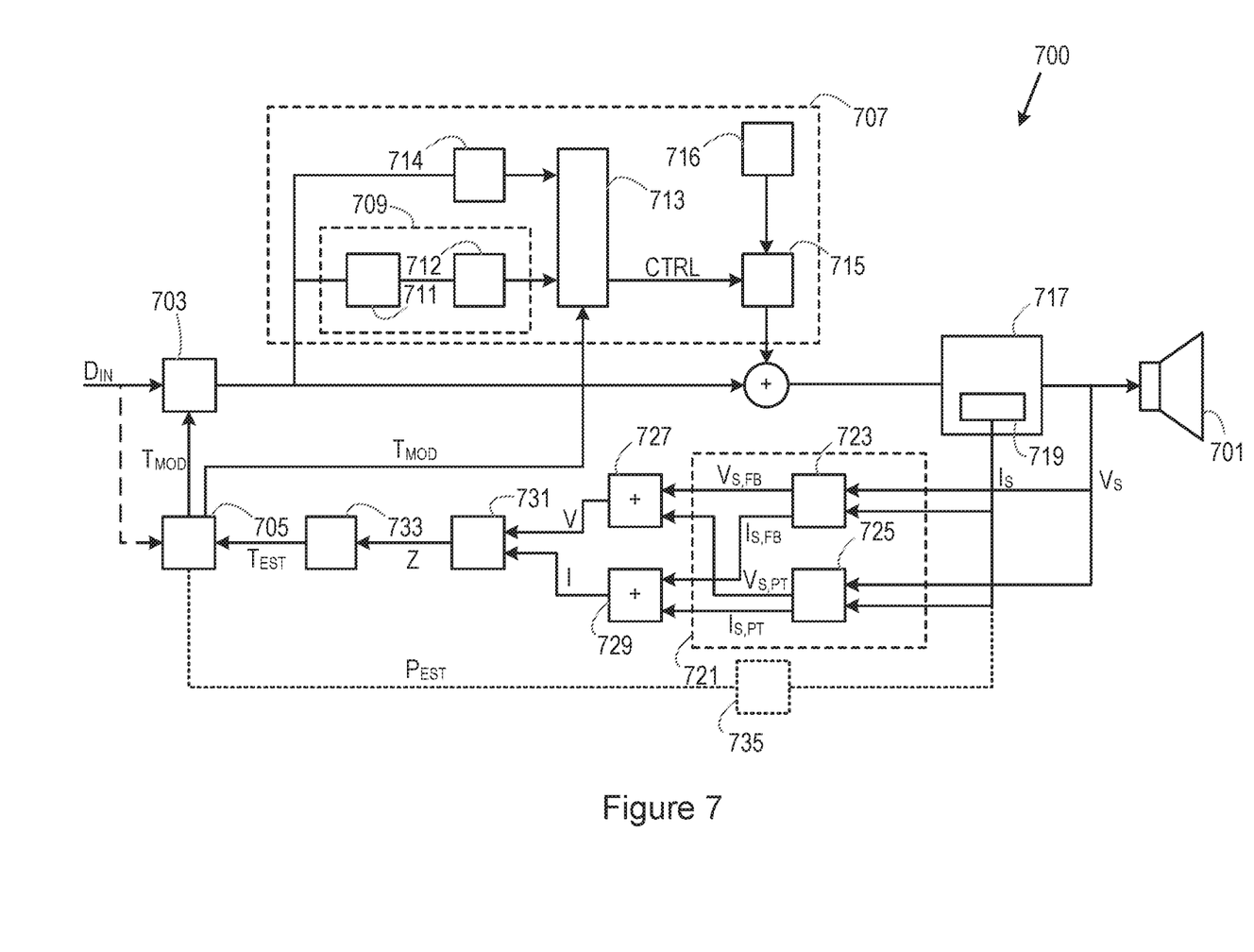
FIG. 7 illustrates an example of a speaker protection circuitry according to some embodiments.

FIG. 7 illustrates an example of a speaker protection system 700 for a speaker 701. It will be appreciated that the speaker 701 may be any form of electromechanical transducer.

A power limitation module 703 receives an input signal $D_{IN}$. In this example, the power limitation module 703 may apply some gain or attenuation to the received input signal $D_{IN}$, based on received control signals from a temperature modelling module 705. In some examples, the received control signals may comprise an indication of a model temperature $T_{MOD}$ of the speaker 701.

The power limitation module 703 may input the processed input signal into a pilot tone generation module 707. The pilot tone generation module 707 may comprise a band detection module 709 configured to receive the audio signal $D_{IN}$ and to determine whether a first magnitude of the audio signal in a first frequency band is above a magnitude threshold, M. In some embodiments, the band detection module 709 comprises a band pass filter 711 for filtering the input signal in the first frequency band and a root measure squared calculation module 712 to calculate the RMS of the signal in the first frequency band in order to compare this value to the threshold magnitude, M.

A condition determination module 713 receives the output of the band detection module 709 which indicates whether the first magnitude of the audio signal in the first frequency band is above the magnitude threshold, M. The condition determination module 713 also receives a magnitude of the audio signal in the full frequency band. In some embodiments, this magnitude of the audio signal in the full frequency band is a root mean squared (RMS) value of the full band audio signal provided by a root mean squared calculation module 714. The condition determination module may also receive an indication of a model temperature $T_{MOD}$ of the speaker 701.

In some embodiments, the condition determination module 713 is configured to determine whether or not to insert a pilot tone into the audio signal for the purposes of determining the temperature of the speaker, and providing speaker protection.

The condition determination module 713 may be configured to determine, in response to the first magnitude of the audio signal in the first frequency band being above a magnitude threshold, M, not to insert a pilot tone into the audio signal. In this example, the condition determination module may send a control signal CTRL to an insertion module 715, indicating to the insertion module not to insert a pilot tone signal generated by a pilot tone generator 716 into the audio signal.

The condition determination module 713 may be configured to, in response to the first magnitude of the audio signal in the first frequency band being below a magnitude threshold, and in response to the model temperature being above a second temperature threshold $T_2$, indicate to the insertion module to inset a pilot tone signal into the audio signal.

The condition determination module 713 may be configured to, in response to the first magnitude of the audio signal in the first frequency band being below a magnitude threshold, and in response to the model temperature being below a second temperature threshold $T_2$, indicate to the insertion module not to insert a pilot tone signal into the audio signal. In this example, the system is configured such that, if the model temperature is low enough, i.e. below the second temperature threshold $T_2$, there is no need to provide the pilot tone as it is highly unlikely that any temperature protection will be required. The pilot tone is therefore only inserted into the audio signal if the model temperature indicates that the temperature is reaching a level at which there may be some need for temperature protection.

The condition determination module 713 may also be configured to, in response to the magnitude of the audio signal in the full frequency band being less than a second threshold magnitude, indicate to the insertion module not to insert a pilot tone signal into the audio band. The condition determination module may be configured to make this indication regardless of whether the magnitude of the audio signal in the first frequency band is above or below the magnitude threshold. In this scenario, as there is low signal throughout the audio band, the likelihood of the speaker overheating is low, in which case there is little need for the pilot tone.

The insertion module 715 may then either insert the pilot tone signal or not insert the pilot tone signal into the audio single, depending on the control signal CTRL received from the condition determination module 713.

The audio signal may then be output by an output driver amplifier 717 into the speaker 701.

The output driver amplifier 717 may comprise current sensing circuitry 719 configured to sense the current $I_S$ flowing through the speaker 701. The speaker voltage $V_S$ may also be sensed or taken directly from the output of the output driver amplifier 717. The sensed speaker current $I_S$ and sensed speaker voltage $V_S$ may be sent to a filter module 721 which may comprise at least two band pass filters 723 and 725. The first band pass filter 723 is configured to receive the speaker voltage and the speaker current and to filter the signals leaving only a first current $I_{S,FB}$ and first voltage $V_{S,FB}$ in the first frequency band. For example, the first frequency band may be 4 kHz to 6 kHz. The second band pass filter 725 is configured to receive the speaker voltage and the speaker current and to filter the signals leaving only a second current $I_{S,PT}$ and second voltage $V_{S,PT}$ at the pilot tone frequency. The pilot tone frequency $F_{PT}$ as discussed previously, may be a low frequency, in particular an inaudible frequency.

The resulting first and second voltages $V_{S,FB}$ and $V_{S,PT}$ are summed together in a first summation module 727 resulting in a voltage signal V comprising the frequency components of both the first frequency band and the pilot tone frequency. The resulting first and second currents, $I_{S,FB}$ and $I_{S,PT}$ are summed together in a second summation module 729 resulting in a current signal I comprising the frequency components of both the first frequency band and the pilot tone frequency.

The signals V and I may be received by an impedance calculation module 731. The impedance calculation module 731 may calculate an impedance Z across the voice coil based on the signals V and I. It will be appreciated that in some instances, when no pilot tone is inserted into the audio signal, the band pass filter 725 will output no signal, and therefore the signals V and I will be equivalent to the signals $V_{S,FB}$ and $I_{S,FB}$. In this example, the impedance Z calculated by the impedance calculation module is a first impedance $Z_1$ as it is based only on the first current and first voltage signals in the first frequency band. In other instances, when a pilot tone is inserted into the audio signal either when there is no audio signal in the first frequency band or the magnitude of the signal in the first frequency band is below the magnitude threshold M, then the impedance calculated by the impedance calculation module 731 is a second impedance $Z_2$ as it is based on the second current and second voltage signals at the pilot tone frequency.

In some examples, when the model temperature $T_{MOD}$ is below the second temperature threshold $T_2$ even if there is no signal in the first frequency band, the condition determination module 713 will still indicate to the insertion module not to insert the pilot tone signal. In this circumstance, the resulting signals V and I may contain very little or no signal. In this scenario, there may be no calculated impedance.

Similarly, if the magnitude of the audio signal in the full frequency band is below the third magnitude threshold, there may be very low signal in the first frequency band, and no pilot tone signal. In this circumstance, the resulting signals V and I may contain very little or no signal. In this scenario, the calculated impedance may be disregarded. For example, minimum thresholds for the magnitude of the resulting signals V and I may be introduced such that no impedance value is calculated unless the resulting signals V and I are above their respective minimum thresholds.

A temperature estimation module 733 is configured to receive the calculated impedance Z and to estimate a temperature, $T_{EST}$ of the speaker based on the impedance Z an impedance of the voice coil at a known temperature, and a known temperature coefficient for the relationship between the impedance and the temperature of the voice coil.

If, as described above, the resulting signals V and I contain very little or no signal, there may be no estimated temperature $T_{EST}$. In some embodiments, where the temperature modelling module 705 may receive a value of $T_{EST}$ calculated from very little or no signals V and I. in this example, the temperature modelling module 705 may be configured to disregard the received value of $T_{EST}$ when the signals V and I are small. In embodiments, where there is no temperature modelling module 705, the estimated temperature may slowly be decreased towards a temperature where no limiting is applied.

This temperature estimate $T_{EST}$ may then be received by the temperature modelling module 705, which may use the estimated temperature alongside other received information to calculate a model temperature $T_{MOD}$.

In particular, the temperature modelling module 705 may receive an estimate of the power dissipated PEST across the speaker. Such an estimate of the power dissipated $P_{EST}$ across the speaker 701 may be calculated based on the sensed current $I_S$ by a power estimation module 735.

The temperature modelling module 705 may alternatively or additionally receive a feed forward signal of the input audio signal $D_{IN}$.

The temperature modeling module may receive the voltage input Vin to the output driver amplifier 717 as an input and may determine a temperature from this voltage input. It may also take an initial condition or an environment temperature as input. The voltage input Vin may be scaled with the amplifier gain to get an estimate of V and then it may be passed through a filter modelling the admittance to determine an estimate of I.

In scenarios where no estimated temperature is calculated, i.e. when there is no signal in the first frequency band, and there is no pilot signal inserted into the audio signal, the temperature modelling module 705 may calculate the model temperature $T_{MOD}$ based on other received information, for example, the power dissipated across the speaker and/or a feed forward of the audio signal.

As described previously, this model temperature $T_{MOD}$ is then received by the power limitation module 703 which may apply a gain or attenuation to the audio signal $D_{IN}$ depending on the value of the model temperature $T_{MOD}$. In particular, if the model temperature $T_{MOD}$ is above a first threshold temperature $T_1$, then the power limitation module is configured to attenuate the audio signal $D_{IN}$. In other words, as the indicated model temperature is high, i.e. above $T_1$, the power limitation module is configured to protect the speaker from over-heating by reducing the magnitude of the input signal.

The model temperature $T_{MOD}$ is also received by the condition determination module 713. As described previously, the condition determination module 713 may be configured to: in response to the first magnitude of the audio signal in the frequency band being below a magnitude threshold, and in response to the model temperature $T_{MOD}$ being above a second temperature threshold $T_2$, indicate to the insertion module to inset a pilot tone signal into the audio signal. In this example, the second temperature threshold $T_2$ is lower than the first temperature threshold $T_1$. In other words, if the model temperature, $T_{MOD}$ is indicating that the temperature of the speaker has not yet reached a level at which the temperature may be of concern, then there may be no need to insert the pilot tone even if there is no signal in the first frequency band. This condition therefore reduces the amount of time the pilot tone is used by the system, thereby reducing the need for extra excursion headroom, and/or any potentially undesirable intermodulation of the audio signal.

Figure 8:
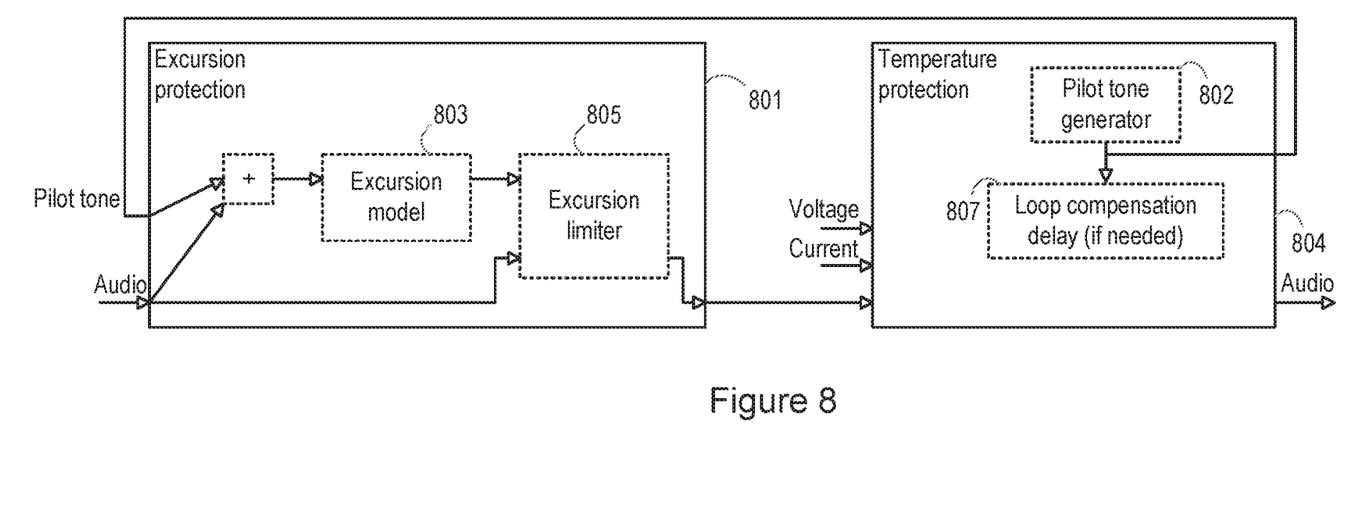
FIG. 8 illustrates an example of an excursion protection system for an electromechanical transducer.

FIG. 8 illustrates an example of an excursion protection system for an electromechanical transducer.

An excursion protection module 801 receives an audio signal and a pilot tone. For example, the audio signal may be the audio signal $D_{IN}$ of FIG. 5 or 7. The pilot tone may be generated by a pilot tone generation module 802. In some embodiments, this pilot tone generation module may be the pilot tone generation module of FIG. 5 or 7. In some examples, the pilot tone may be generated or inserted into the audio signal as described previously as part of some temperature protection circuitry 804. In some examples, when the pilot tone is not inserted into the audio signal as described above, the excursion protection module 801 may receive no pilot tone signal. In this case, the excursion protection may be performed based on only the audio signal.

The excursion protection module 801 may receive the pilot tone signal as a feedback signal, and may add this signal to the audio signal in order to provide an input to an excursion model 803 of the electromechanical transducer. The excursion model 803 may model the predicted excursion of the electromechanical transducer for a particular input signal. An excursion limitation module 805 may then limit the input signal based depending on the maximum allowable excursion of the electromechanical transducer.

For example, the audio signal including the pilot tone may be limited to 0 dBFS such that the signal does not exceed the maximum allowable excursion.

In some embodiments, a loop compensation delay 807 may be added in the temperature protection such that the pilot tone is not inserted into the audio signal until after the excursion protection for such a pilot tone has been applied.

In some embodiments, instead of limiting the pilot tone and the audio signal such that they do not exceed a maximum excursion limit, the maximum excursion limit may be adjusted based on the magnitude of the pilot tone signal. In other words, the excursion limit may be reduced when the magnitude of the pilot tone is high. This will then limit the audio signal more when the magnitude of the pilot tone is high in order to allow for any extra excursion caused by the pilot tone.

Figure 9:
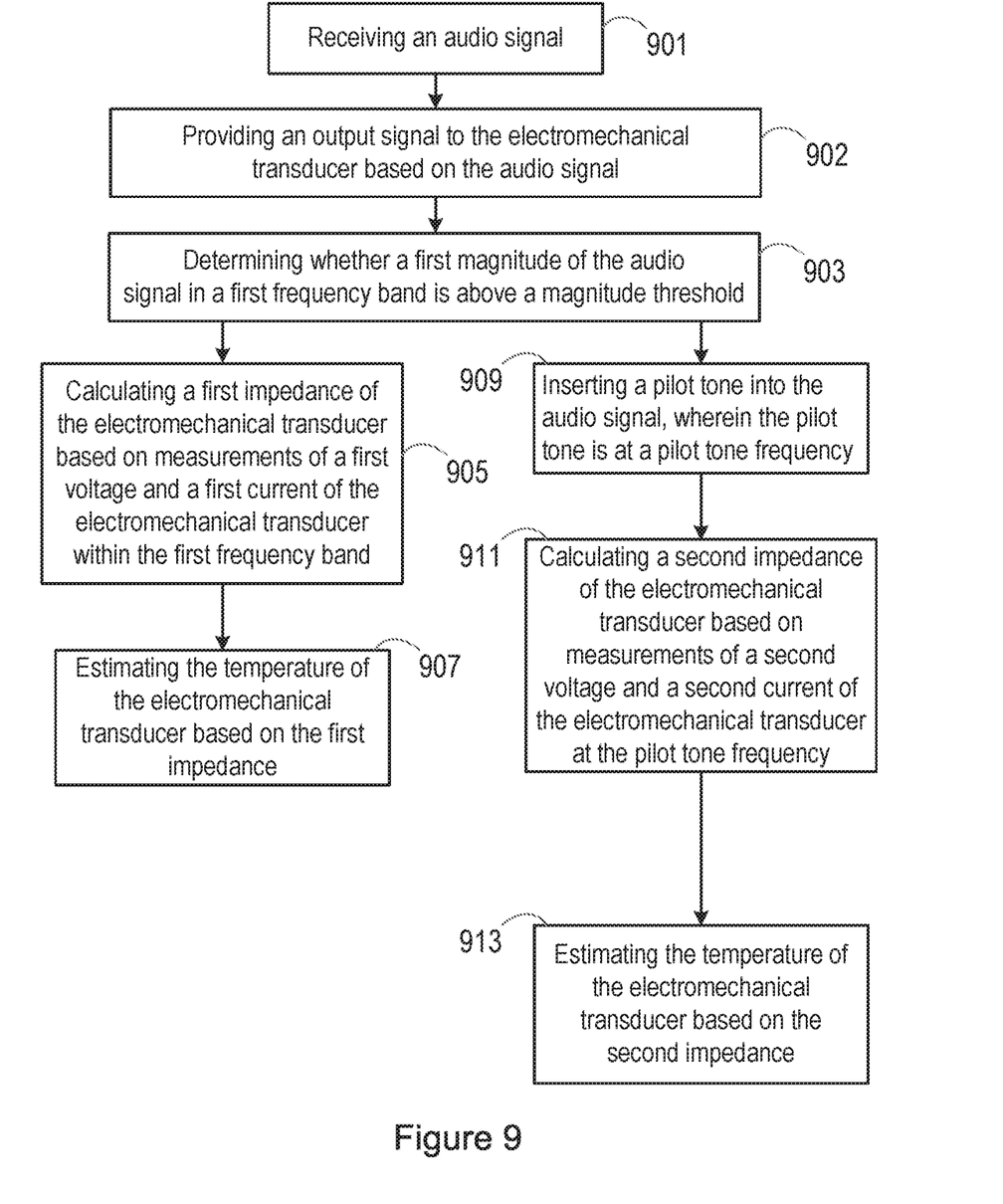
FIG. 9 illustrates a method of estimating a temperature of an electromechanical transducer according to some embodiments.

FIG. 9 illustrates a method of estimating a temperature of an electromechanical transducer according to some embodiments. The method as described herein may be performed by a temperature determination apparatus.

In step 901, the method comprises receiving an audio signal.

In step 902, the method comprises providing an output signal to the electromechanical transducer based on the audio signal. The output signal may in some examples comprise a pilot tone signal.

In step 903, the method comprises determining whether a first magnitude of the audio signal in a first frequency band is above a magnitude threshold, M. In this stage of the method, the method is determining whether the signal level in a first frequency band, for example a frequency band known to contain signals having a linear or known relationship between impedance and temperature on the electromechanical transducer, is high enough to provide sensed voltage and current signals that could be used to calculate an estimated temperature of the electromechanical transducer. In some embodiments, the first frequency band is between 4 kHz and 6 kHz. In some embodiments, the first frequency band is chosen depending on the particular speaker being driven. In some examples, the first frequency band is chosen such that the relationship between the impedance and the temperature of the speaker is known within the first frequency band.

If the first magnitude is above or equal to the magnitude threshold, the method passes to step 905. Step 905 comprises calculating a first impedance of the electromechanical transducer based on measurements of a voltage and a current of the electromechanical transducer within the first frequency band. This step of calculating a first impedance is therefore performed in response to first magnitude being above or equal to the magnitude threshold.

In some examples, the measurements of the first voltage and the first current are made by sensing the current and voltage across the electromechanical transducer and filtering the sensed current and voltage to determine the first voltage and first current within the first frequency band.

The method then passes to step 907 which comprises estimating the temperature of the electromechanical transducer based on the first impedance. The temperature estimate may in some embodiments be estimated based on a known temperature coefficient for the relationship between the impedance across the electromechanical transducer and the temperature of the electromechanical transducer.

If, in step 903, the first magnitude is below to the magnitude threshold, the method passes to step 909. In step 909, the method comprises inserting a pilot tone into the audio signal, wherein the pilot tone is at a pilot tone frequency. The pilot tone frequency may, for example, be an inaudible frequency so as to not interfere with the audio signal, for example the pilot tone frequency may be 48 Hz.

In some embodiments, the magnitude of the pilot tone is adjustable. In some embodiments, the magnitude of the pilot tone is dependent on the first magnitude. For example, the pilot tone magnitude and the first magnitude may have an inverse relationship.

In some embodiments, step 909 is only performed in response to determining that a model temperature $T_{MOD}$, is above a second temperature threshold.

The method then passes to step 911 in which the method comprises calculating a second impedance of the electromechanical transducer based on measurements of a second voltage and a second current of the electromechanical transducer at the pilot tone frequency. This step of calculating a second impedance may therefore performed in response to first magnitude being below the magnitude threshold.

In some examples, the measurements of the second voltage and the second current are made by sensing the current and voltage across the electromechanical transducer and filtering the sensed current and voltage to determine the second voltage and second current at the pilot tone frequency.

In some embodiments, both the first and second current and the first and second voltage are used to determine the second impedance.

The method then passes to step 913 which comprises estimating the temperature of the electromechanical transducer based on the second impedance. Similarly to as in step 907, the estimation of the temperature may comprise estimating the temperature based on a known temperature coefficient for the relationship between the impedance across the electromechanical transducer and the temperature of the electromechanical transducer.

In some embodiments, if the estimated temperature at either step 913 or 907 is above a first temperature threshold, the method further comprises attenuating the audio signal. The amount of attenuation may depend on how far above the first threshold temperature the estimated temperature is.

In some embodiments, the method further comprises calculating a model temperature, $T_{MOD}$ of the electromechanical transducer based on the estimated temperature, $T_{EST}$; and if the model temperature, $T_{MOD}$ of the electromechanical transducer is above a first temperature threshold, $T_1$, attenuating the audio signal. The model temperature $T_{MOD}$ may be based on the audio signal. The model temperature may additionally or alternatively be based on an estimate of the power dissipated across the electromechanical transducer.

In some embodiments, an excursion protection model is used to model the excursion of the electromechanical transducer based on the magnitude to the audio signal and the pilot tone magnitude.

In some embodiments, the audio signal and pilot tone signal are limited based on a maximum excursion limit. For example, the magnitude of the audio signal together with the pilot tone may be limited such that the total excursion caused by both signals does not exceed the maximum excursion limit.

In other embodiments, the audio signal is limited such that the excursion of the audio signal is below a maximum excursion limit where the maximum excursion limit is adjusted based on the magnitude of the pilot tone signal. In other words, the maximum excursion limit of the audio signal itself may be reduced if the magnitude of the pilot tone is high.

The skilled person will thus recognise that some aspects of the above described apparatus and methods, for example, the calculations performed by the processor may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments of the present disclosure will be implemented on a DSP (Digital Signal Processor), ASIC (Application Specific Integrated Circuit) or FPGA (Field Programmable Gate Array). Thus the code may comprise conventional program code or microcode or, for example, code for setting up controlling an ASIC or FPGA. The code may also comprise code for dynamically configuring re-configurable apparatus such as re-programmable logic gate arrays. Similarly, the code may comprise code for a hardware description language such as Verilog™ or VHDL. AS the skilled person will appreciate, the code may be distributed between a plurality of coupled components in communications with one another. Where appropriate, the embodiments may also be implemented using code running on a field-(re)programmable analogue array or similar device in order to configure analogue hardware.

Some embodiments of the present disclosure may be arranged as part of an audio processing circuit, for instance an audio circuit which may be provided in a host device. A circuit according to an embodiment of the present disclosure may be implemented as an integrated circuit. One or more speakers may be connected to the integrated circuit in use.

Embodiments of the present disclosure may be implemented in a host device, especially a portable and/or battery powered host device such as a mobile telephone, an audio player, a video player, a PDA, a mobile computing platform such as a laptop computer or tablet and/or a games device, for example. Embodiments of the disclosure may also be implemented wholly or partially in accessories attachable to a host device, for example, in active speakers or headsets or the like.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope. Terms such as amplify or gain include possible applying a scaling factor or less than unity to a signal.

The invention claimed is:

1. A system for estimating a temperature of an electromechanical transducer, comprising:
    an input for receiving an audio signal,
    an output for providing an output signal based on the audio signal to the electromechanical transducer;
    a band detection module configured to determine whether a first magnitude of the audio signal in a first frequency band is above a magnitude threshold;
    an insertion module configured to insert a pilot tone into the audio signal in response to the first magnitude being below the magnitude threshold, wherein the pilot tone is at a pilot tone frequency,
    an impedance calculation module configured to:
        in response to the first magnitude being above or equal to the magnitude threshold, calculate a first impedance of the electromechanical transducer based on measurements of a first voltage and a first current of the electromechanical transducer within the first frequency band, and
        in response to the first magnitude being below the magnitude threshold, calculate a second impedance of the electromechanical transducer based on measurements of a second voltage and a second current of the electromechanical transducer at the pilot tone frequency; and
    a temperature estimation module configured to estimate the temperature of the electromechanical transducer based on the first impedance or the second impedance.

2. A system as claimed in claim 1 wherein the pilot tone frequency is outside of an audible frequency band.

3. A system as claimed in claim 1 wherein the first frequency band is configured such that an impedance of the electromechanical transducer and a temperature of the electromechanical transducer have a known relationship within the first frequency band.

4. A system as claimed in claim 3 wherein the first frequency band is between 4 kHz and 6 kHz.

5. A system as claimed in claim 4 wherein a pilot tone magnitude of the pilot tone is adjustable.

6. A system as claimed in claim 5 wherein the pilot tone magnitude is set based on the first magnitude.

7. A system as claimed in claim 6 wherein the pilot tone magnitude and the first magnitude have an inverse relationship.

8. A system as claimed in claim 1 wherein the impedance calculation module is configured to calculate the second impedance based on measurements of the second voltage and the second current of the electromechanical transducer at the pilot tone frequency, $F_{PT}$ and further based on measurements of the first voltage and the first current of the electromechanical transducer within the frequency band.

9. A system as claimed in claim 1 further comprising:
    an excursion protection module configured to limit the audio signal based on an excursion limit of the electromechanical transducer a pilot tone magnitude of the pilot tone.

10. A system as claimed in claim 9 further comprising a delay module configured to delay insertion of the pilot tone into the audio signal until the excursion protection module has limited the audio signal based on the pilot tone magnitude.

11. A system as claimed in claim 1 further comprising:
    a power limitation module configured to, if the estimated temperature is above a first temperature threshold, attenuate the audio signal to provide the output signal.

12. A system as claimed in claim 1 wherein the pilot tone magnitude is related to the estimated temperature.

13. A system as claimed in claim 1 further comprising:
    a temperature modelling module configured to calculate a model temperature of the electromechanical transducer based on the estimated temperature and based on a temperature model of the electromechanical transducer;
    a power limitation module configured to, if the model temperature of the electromechanical transducer is above a first temperature threshold, attenuate the audio signal.

14. A system as claimed in claim 13 wherein, the insertion module is configured to insert the pilot tone into the audio signal, in response to a determination that the model temperature is above a second temperature threshold wherein the second model temperature is below the first temperature threshold.

15. A system as claimed in claim 13 wherein the pilot tone magnitude is related to the model temperature.

16. A system as claimed in claim 13 wherein the temperature modelling module is configured to calculate the model temperature of the electromechanical transducer based on the audio signal.

17. The system as claimed in claim 13 further comprising:
    a power estimation module configured to calculate an estimated dissipated power across the electromechanical transducer; and wherein:
    the temperature modelling module is further configured to calculate the model temperature of the electromechanical transducer based on the estimated dissipated power.

18. An electronic apparatus comprising a system as claimed in claim 1.

19. An electronic apparatus as claimed in claim 18 wherein said apparatus is at least one of: a portable device; a battery power device; a computing device; a communications device; a gaming device; a mobile telephone; a personal media player; a laptop, tablet or notebook computing device.

20. A method for estimating a temperature of an electromechanical transducer, comprising:
- receiving an audio signal;
- providing an output signal to the electromechanical transducer, based on the audio signal;
- determining whether a first magnitude of the audio signal in a first frequency band is above a magnitude threshold;
- in response to the first magnitude being above or equal to the magnitude threshold,
  - calculating a first impedance of the electromechanical transducer based on measurements of a first voltage and a first current of the electromechanical transducer within the first frequency band, and
  - estimating the temperature of the electromechanical transducer based on the first impedance; and
- in response to the first magnitude being below the magnitude threshold,
  - inserting a pilot tone into the audio signal, wherein the pilot tone is at a pilot tone frequency,
  - calculating a second impedance of the electromechanical transducer based on measurements of a second voltage and a second current of the electromechanical transducer at the pilot tone frequency, and
  - estimating the temperature of the electromechanical transducer based on the second impedance.

21. Software code stored on a non-transitory storage medium which, when run on a suitable processor, performs the method of claim 20.

* * * * *